US006187390B1

(12) United States Patent
Seeger et al.

(10) Patent No.: US 6,187,390 B1
(45) Date of Patent: Feb. 13, 2001

(54) USE OF HYDRIDE-CONTAINING ALUMINUM OXIDE FOR PRODUCING OPTICALLY DETECTABLE MARKINGS AND INSCRIPTIONS

(75) Inventors: Oliver Seeger, Mannheim; Stefan Faber, Wadern; Michael Veith, St. Ingbert; Eckehard Fritscher, Waldfischbach; Wilma M. Dausch, Limburgerhof; Raimund Schmid, Neustadt-Mussbach, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/319,913

(22) PCT Filed: Dec. 1, 1997

(86) PCT No.: PCT/EP97/06710

§ 371 Date: Jun. 16, 1999

§ 102(e) Date: Jun. 16, 1999

(87) PCT Pub. No.: WO98/26937

PCT Pub. Date: Jun. 25, 1998

(30) Foreign Application Priority Data

Dec. 16, 1996 (DE) .............................................. 196 52 242

(51) Int. Cl.[7] .............................. B05D 3/06; C23C 16/40; G03C 1/705
(52) U.S. Cl. .......................... 427/555; 427/552; 427/557; 427/255.31; 430/270.11; 430/292
(58) Field of Search .................................... 427/555, 557, 427/558, 552, 255.31; 430/270.1, 270.11, 270.12, 292, 293, 296

(56) References Cited

U.S. PATENT DOCUMENTS

| 3,978,036 | * | 8/1976 | Pollard .................................... 264/75 |
| 4,307,047 | | 12/1981 | Edinger et al. . |
| 4,344,987 | | 8/1982 | Ostertag et al. . |
| 4,816,374 | | 3/1989 | Lecomte . |
| 5,053,440 | | 10/1991 | Schueler et al. . |
| 5,206,280 | * | 4/1993 | Williams .............................. 524/409 |
| 5,445,923 | * | 8/1995 | Takahashi et al. ................... 430/340 |
| 5,995,142 | * | 9/1999 | Yoshino et al. ...................... 427/205 |

FOREIGN PATENT DOCUMENTS

| 690993 | | 11/1995 | (AU) . |
| 29 36 926 | | 4/1981 | (DE) . |
| 44 15 802 | | 11/1995 | (DE) . |
| 195 29 241 | | 2/1997 | (DE) . |
| 0 045 851 | | 2/1982 | (EP) . |
| 0 400 305 | | 12/1990 | (EP) . |
| 0607597A2 | * | 7/1994 | (EP) . |
| 401249171 | * | 10/1989 | (JP) . |
| 02224885 | * | 9/1990 | (JP) . |
| 06183127 | * | 7/1994 | (JP) . |

OTHER PUBLICATIONS

M. Veith, et al., Journal of Materials Science Letters, vol. 13, pp. 335–337, "New Metal–Ceramic Composites Grown by Metalorganic Chemical Vapour Deposition," 1994, No Month.

* cited by examiner

*Primary Examiner*—Marianne Padgett
(74) *Attorney, Agent, or Firm*—Oblon, Spivak, McClelland, Maier & Neustadt, P.C.

(57) ABSTRACT

The invention concerns the use of hydride-containing aluminium oxide for producing optically detectable markings and inscriptions.

8 Claims, No Drawings

USE OF HYDRIDE-CONTAINING ALUMINUM OXIDE FOR PRODUCING OPTICALLY DETECTABLE MARKINGS AND INSCRIPTIONS

The present invention relates to the use of hydride-containing aluminum oxide for producing optically recognizable markings and inscriptions.

The present invention furthermore relates to a process for producing optically recognizable markings and inscriptions, and to the use of the marked or inscribed substrates marked by this process for information storage.

The clear marking of a wide variety of products is of growing importance in virtually all sectors of industry. Information such as serial numbers, use-by dates, bar codes and company logos have to be applied to a wide variety of materials. Conventional marking techniques, such as labeling, stamping, printing and embossing, are widespread.

However, non-contact marking using lasers, which permits extremely fast and flexible marking of substrates having planar or nonplanar surfaces, is of increasing importance. In this process, the laser-markable material can be applied to the surface of the article to be marked in the form of a film or, in particular if the article is made of plastic, it can be incorporated directly and then inscribed. The markings covered with plastic in this way are particularly durable and abrasion-resistant and can be produced using a laser through a color change of pigments.

Thus, DE-A-29 36 926 discloses incorporating carbon black or graphite into plastic and effecting decolorization by laser irradiation, producing markings. EP-A-400 305 describes copper (II) hydroxide phosphate or molybdenum (VI) oxide as plastic additives which are colorless in the visible wavelength region, but become a dark color on exposure to a laser. Finally, the marking agent used in U.S. Pat. No. 4,816,374 is antimony trioxide and that used in DE-A-44 15 802 is a mica pigment coated with antimony-doped tin dioxide.

However, the known marking agents are unsatisfactory in various respects. They either result in discoloration of the plastic even before the marking operation, i.e. are not colorless, or they contain undesired heavy metals.

It is an object of the present invention to overcome these deficiencies and to provide a marking agent having advantageous properties.

We have found that this object is achieved by the use of hydride-containing aluminum oxide for producing optically recognizable markings or inscriptions.

We have also found a process for producing optically recognizable markings or inscriptions, which comprises coating the hydride-containing aluminum oxide onto a substrate to be marked, or incorporating it into the substrate material, and converting the virtually colorless hydride-containing aluminum oxide into aluminum oxide containing black, metallic aluminum by specific exposure to an energy source.

Finally, we have found that the substrates marked or inscribed by this process can be used for information storage.

The hydride-containing aluminum oxide employed in accordance with the invention generally has a hydrogen content of from 15 to 100 atom-%, preferably from 30 to 70 atom-%, in each case based on aluminum, and is highly suitable for producing optically recognizable markings and inscriptions since it is virtually colorless or has a yellow to brown color, depending on the layer thickness present when applied in a film-like manner or on the particle dimensions in the case of a particulate form, but is always transparent and is converted into aluminum oxide containing gray to black, metallic aluminum on heating (generally at >400° C., in particular from 450 to 500° C.), this aluminum oxide generally having a content of metallic aluminum of from 15 to 100 mol %, preferably from 30 to 70 mol %, in each case based on $Al_2O_3$.

Through the action of the thermal energy, the aluminum-hydrogen bond is cleaved, hydrogen escapes, and aluminum particles are formed in a matrix of aluminum oxide (nanocomposite having an aluminum particle size of up to about 50 nm).

The aluminum particles are protected in the matrix against aging and corrosion and enable a durable, abrasion-resistant and high-contrast marking to be produced.

The size of these aluminum clusters is dependent on the duration of the energy supply and varies from 1 to 200 nm. The extent of these aluminum islands (and thus the degree of blackening) is correlated with the shift of the Al peak in the $^{27}Al$ NMR spectrum and can be monitored in this way and via transmission electron spectroscopy.

The hydride-containing aluminum oxide employed in accordance with the invention as marking agent can, as described in DE-A-195 29 241, which was not published before the priority date of the present application, be prepared by gas-phase decomposition of monoalkoxyaluminum dihydrides of the formula I $$Al(OR)H_2 \qquad\qquad I$$

where R is $C_3$–$C_{10}$-alkyl or $C_5$–$C_8$-cycloalkyl, under inert conditions at from 250 to 400° C.

Particularly suitable here are alkoxyaluminum dihydrides I which contain branched $C_4$–$C_8$-alkoxy radicals, such as tert-butoxyaluminum dihydride.

The alkoxyaluminum dihydrides I themselves can be prepared, as likewise disclosed in DE-A-195 29 241, which was not published before the priority date of the present application, by reacting aluminum hydride with the corresponding alcohol in a molar ratio of 1:1; aluminum hydride can be prepared in situ by reaction of an alkali metal aluminum hydride with aluminum chloride.

If the hydride-containing aluminum oxide is to be applied as a coherent film to a substrate to be marked, the substrate coating can advantageously be combined with preparation of the hydride-containing aluminum oxide by carrying out the gas-phase decomposition of the alkoxyaluminum dihydride I in the presence of the substrate.

Suitable substrates here are articles or workpieces having a wide variety of shapes and sizes which can be heated to the reaction temperature of from 250 to 400° C.

Examples of suitable substrate materials are metals, such as copper, silver, gold, chromium, nickel, cobalt, palladium, platinum and aluminum, metal alloys, for example steel, and semimetals, such as silicon, and nonmetallic materials, such as quartz and other types of glass.

The reactor employed for the coating should be matched to the particular substrate and its dimensions. Electroconductive metal tabs or foils a square centimeter in size can, as described, for example, in DE-A-195 29 241, which was not published before the priority date of the present application, and by M. Veith and S. Kneip in Journal of Materials Science Letters 13 (1994), pages 335–337, be coated with hydride-containing aluminum oxide in any desired layer thickness after being rendered inert under a reduced pressure of, generally, from $10^{-4}$ mbar to atmospheric pressure, in a reaction tube made from Duran glass or quartz which is connected, on the inlet side, to a storage vessel containing the alkoxyaluminum dihydride I and heated to the desired evaporation temperature, and on the outlet side to a vacuum pump and which is located in a high-frequency induction field with the aid of which the substrate tabs are heated.

If the hydride-containing aluminum oxide is to be incorporated in the form of a powder into plastics, which is advantageously carried out after their shaping, where the conversion temperature of the hydride-containing aluminum oxide should naturally not be exceeded, or is to be used in coatings, paints or printing inks, the layer of hydride-containing aluminum oxide deposited on a suitable substrate during gas-phase decomposition can be scraped off or detached and comminuted to the desired particle size.

A further way of employing the hydride-containing aluminum oxide in particulate form both in plastics and in coatings, paints or printing inks comprises coating pigmentary substrates with the hydride-containing aluminum oxide. This can advantageously be carried out in a fluidized-bed reactor (for example described in EP-A-45 851) in which the pigment particles are heated to the reaction temperature with fluidization by means of an inert fluidization gas and into which the alkoxyaluminum dihydride I is transferred, with the aid of an inert carrier gas, from an upstream evaporator held at the corresponding temperature.

Suitable pigmentary substrates are both inorganic and organic pigments which are stable at the coating temperature, for example metal platelets, such as aluminum flakes, and oxidic platelets, such as mica, talc and glass flakes, which may in each case be coated with a high- or low-refraction-index, selectively absorbent or colorless metal oxide coating.

Suitable energy sources for the subsequent marking are in particular those which liberate thermal energy, i.e. cause warming of the irradiated substrate or coating of hydride-containing aluminum oxide and thus effect the formation of aluminium particles. Examples of particularly suitable energy sources are masers and especially lasers, in particular those which emit in the IR to VIS region, such as $CO_2$ lasers and Nd:YAG lasers, which are distinguished by particularly sharp markings.

The marking (conversion of the hydride-containing to aluminum metal-containing aluminum oxide coating) can be controlled in a targeted manner through the irradiation output of the energy source, in particular the laser, and the irradiation time or the number of pulses in the case of pulsed lasers. Depending on the laser type and inscription method (mask method and laser marking by beam deflection), the novel marking agent can be used to produce minimum line thicknesses of, generally, 0.5 μm and maximum line thicknesses of 10 mm. Dots can be produced by the action of two perpendicular lasers whose energy is sufficient for marking only at the intersection of the ray paths.

The laser radiation not only effects the optically recognizable change based on the change in the chemical composition of the hydride-containing aluminum oxide, but also results in changes to physical properties, such as absorption, refractive index, electrical conductivity and thermal conductivity, which can likewise be detected.

Finally, the substrates marked or inscribed in accordance with the invention are also suitable for information storage. Depending on the energy and duration of the action of a laser beam on the coating of hydride-containing aluminum oxide, various gray shades are achieved through increasing formation of metallic aluminum, resulting in a change in the ratio between absorption and refraction at the irradiated point. Changes in refractive index can also cause phase shifts in the reflected light. The stored information can be detected by, for example, recording and decoding the brightness differences in the bright/dark-structured coating via the varying reflection of incident laser light.

EXAMPLE

A 3×3 $cm^2$ matted copper plate was heated inductively to 320° C. in the above-described apparatus in a nitrogen atmosphere under a pressure of 100 Pa. 0.2 g of tert-butoxyaluminum dihydride was transferred from a storage vessel over the course of 10 minutes at room temperature into the reaction space, where they were decomposed on the copper plate with formation of a hydride-containing aluminum oxide film with a thickness of about 1 μm.

This coating was written using a $CO_2$ laser with variable output from 100–1000 W and variable exposure time (μs–s) and a speed of rotation of 1000 rpm. A clear, high-contrast, abrasion-resistant inscription which is suitable as a bar code was obtained.

We claim:
1. A process which comprises: (A)(1) either coating a transparent hydride-containing aluminum oxide which has a hydrogen content of from 15 to 100 atom-% per aluminum atom, onto a substrate, or (2) incorporating said transparent hydride-containing aluminum oxide into a substrate; and (B) converting said transparent hydride-containing aluminum oxide into aluminum oxide containing gray to black, metallic aluminum by exposure to an energy source.

2. The process as claimed in claim 1, wherein said energy source effects warming of the substrate.

3. The process as claimed in claim 1, wherein the energy source is a laser which emits in the IR to VIS region.

4. The process as claimed in claim 1, wherein said coating onto the substrate, or incorporating into the substrate, is of (a) a film consisting essentially of said hydride-containing aluminum oxide, or (b) said hydride-containing aluminum oxide in the form of dispered particles, or (c) dispersed pigment particles coated with said hydride-containing aluminum oxide.

5. The process as claimed in claim 4, wherein the particles of hydride-containing aluminum oxide or the pigment particles coated with hydride-containing aluminum oxide are dispersed in said coating as a binder layer, the binder being a paint binder or printing-ink binder.

6. The process as claimed in claim 1, wherein particles of hydride-containing aluminum oxide or pigment particles coated with hydride-containing aluminum oxide are incorporated into molding compositions made of plastic, semi-finished products made of plastics or finished products made of plastic.

7. The process as claimed in claim 2, wherein said transparent hydride-containing aluminum oxide is preparable by gas-phase decomposition of monoalkoxyaluminum dihydrides of formula I $$Al(OR)H_2 \qquad\qquad I$$

where R is $C_3$–$C_{10}$-alkyl or $C_5$–$C_8$-cycloalkyl, under inert conditions at from 250 to 400° C., either prior to (A), or combined with (A).

8. The process as claimed in claim 7, wherein said transparent hydride-containing aluminum oxide is prepared by said gas-phase decomposition of monoalkoxyaluminum dihydrides of formula I.

* * * * *